B. M. COFFEE.
CAR LIGHTING SYSTEM.
APPLICATION FILED DEC. 20, 1919.
1,436,697.
Patented Nov. 28, 1922.
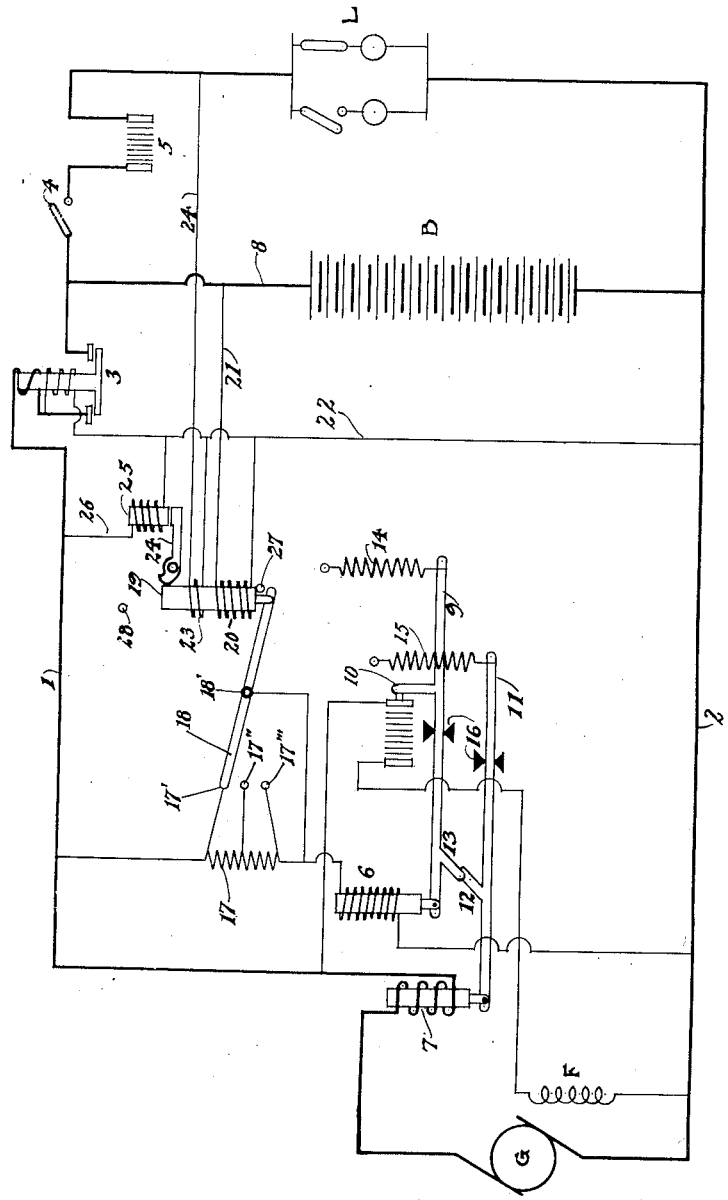
INVENTOR
B. M. Coffee
BY
Dull, Warfield & Dull
ATTORNEY Patented Nov. 28, 1922.

1,436,697

UNITED STATES PATENT OFFICE.

BASSETT M. COFFEE, OF JERSEY CITY, NEW JERSEY, ASSIGNOR TO SAFETY CAR HEATING & LIGHTING COMPANY, A CORPORATION OF NEW JERSEY.

CAR-LIGHTING SYSTEM.

Application filed December 20, 1919. Serial No. 346,226.

*To all whom it may concern:*

Be it known that I, BASSETT M. COFFEE, a citizen of the United States, residing at Jersey City, in the county of Hudson and State of New Jersey, have invented certain new and useful Improvements in Car-Lighting Systems, of which the following is a full, clear, and exact description, such as will enable others skilled in the art to which it appertains to make and use the same.

This invention relates to systems of electrical distribution and more particularly to electric regulating apparatus for the automatic control of variable speed generators employed to charge storage batteries and supply lamps in a railway car lighting system.

The embodiment of the invention herein represented and described constitutes a subordinate modification of my invention, disclosed and claimed more broadly in application for United States Letters Patent, Serial No. 304,896 filed June 17, 1919.

The primary object of the present invention is to provide improved means in a system of the character above mentioned wherewith the output of the generator is varied by the electrical setting of its regulator under the control of instrumentalities indicative of the battery capacity under certain conditions.

A further object is to provide simple and practical means operative in accordance with battery voltage, as distinct from the generator voltage, and associated in the system and operable to establish at normal recurring intervals the electrical effectiveness of a regulating coil responsive to a function of the generator output.

Other objects and advantages will be in part noted hereinafter in connection with the following description of the accompanying drawing which illustrates a typical embodiment of the invention and in which the figure is a simplified wiring diagram of a system including the improvement.

As illustrated, a generator G is connected by main lines 1 and 2, through an automatic switch 3 with a battery B, and through a lamp switch 4 and a lamp voltage regulating resistance 5 with lamps L. The generator is preferably axle driven and consequently variable speed and provided with a shunt field winding F, having in series a carbon pile variable resistance C. The degree of compression of the latter and consequently the output of the generator is governed, in the embodiment shown, by a regulator including a coil 6 connected across the main lines and responsive to generator voltage fluctuations and tending, when active, to maintain constancy of generator voltage, and a coil 7 connected in the main line 1 and tending, when active, to maintain constancy of total generator current. It will be understood, of course, that the coil 7 may be connected, if desired, in the battery branch 8 so that the coil when active will tend to maintain the constancy of that portion of the generator current flowing to the battery.

In the system chosen for illustrative purposes, the voltage coil 6 has its core connected by lever 9 and arm 10 to act on the carbon pile, while coil 7 has its core connected through lever 11 and a lower offset 12 positioned to engage an upper offset 13 on lever 9 whereby the active effect of the current coil is transmitted through arm 10 to the carbon pile C. The coils 6 and 7 are respectively counterbalanced by springs 14 and 15 connected with the levers 9 and 11 at the ends opposite the fulcrums 16. The regulating coils may be designed to operate, for example, as follows:

At the beginning of charge to a substantially depleted battery under conditions such that the generator voltage, as limited by coil 6, would permit an excessive current output from the generator, the regulation is accomplished by the co-operative action of the coils 7 and 6, with the result that the generator current is held within preselected limits. With respect to speed changes tending to disturb the generator current, regulation under these conditions may be effective dominantly by the coil 7, and as the charge progresses and the counter E. M. F. of the battery rises, the regulation may be assumed by the voltage coil 6 which tends to maintain constancy of generator voltage independently of speed changes, and of the state of battery charge and of variation in the lamp load. During this interval it will be apparent that the coil 7 may be weakened below the counteracting force of its spring 15 and thus render inoperative the connection between the offsets 12 and 13 of the regulating levers 9 and 11 respectively.

For the purposes of definition it may be mentioned that in this specification the recitation of elements tending to maintain constancy of generator voltage or current independently of speed changes includes means responsive either to fluctuations of generator voltage or to fluctuations of generator current since in both cases, so far as speed changes of the generator are concerned, the result is to maintain the constancy of both voltage and current. The recitation of means tending to maintain constancy of generator voltage in spite of speed changes and in spite of changes in battery voltage refers, of course, only to a regulator tending to maintain constancy of generator voltage against speed variations and also against changes in the state of battery charge over an extended period.

In order to set the regulator to work for constancy of a function of the generator output, i. e. current or voltage, at one or more intervals in accordance with the instant and actual capacity of the battery for charge, there is provided a variable resistance 17 in series with the regulating coil 6. Resistance 17 is governed through a lever 18 pivoted at 18' and connected core 19, by a coil 20 permanently connected by lines 21 and 22 across the battery, and a coil 23 permanently connected by lines 24 and 22 across the lamps. These coils are wound to assist each other and designed so that the strength of the coil 20, responsive to the battery on open circuit, substantially coincides with the strength of coils 20 and 23 together when the battery is on discharge. Core 19, however, is restrained against movement by the coils 20 and 23 at all times save when the latter are influenced only by the battery open circuit voltage or its discharge voltage. That is to say, for example, core 19 is prevented from registering the effects of its coils when the battery and lamps are being supplied by the generator. To accomplish this end there may be provided a pivoted arm 24, having a cam extremity adjacent the fulcrum and adjacent the core 19, and having its opposite end constituting the armature for magnet winding 25 connected by lines 26 and 22 across the generator mains and active at generator voltages high enough to close the main switch 3, and preferably at slightly lower voltages, to attract the armature of lever 24 and thereby cam the opposite extremity against the core 19 and restrain the latter against movement at all times, save when the main switch 3 is open and the generator voltage is depressed, for example, during the period of train stops.

Consequently, when the generator is ineffective to supply charging current, coils 20 and 23 become active to balance the core 19 against one of, or intermediate, two spaced stops 27 and 28 thereby to shunt all, a part, or none of the resistance by contact of lever 18 against one of the contacts 17', 17" and 17"'. In other words, the resistance in series with the voltage coil 6 may be varied and established in accordance with the capacity of the battery to be charged as indicated by its open circuit or discharging voltage. For example, if the normal battery of sixteen cells has in fact become subnormal due to the presence of two dead cells, this condition will be compensated for on the succeeding train stop by the action of the coils 20 and 23 as described, so that when the generator voltage rebuilds and the main switch 3 recloses the regulations of the generator will be established by the coil 6 on a proportionately reduced voltage to insure against over-charge of the subnormal battery.

As above described also, the magnet coil 25 is preferably designed to attract the armature end of lever 24 slightly prior to the closing of the main switch 3 whereby the setting of the resistance 17 is, so to speak, locked at all times while the coils 20 and 23 might be affected by the generator voltage.

It will be understood that the invention as described, while illustrated herein as embodied in one well known type of car lighting system, is equally applicable with its advantages to various other types of systems wherein the generator is governed by a regulator including an electro-responsive coil active to control the generator current or voltage.

Having described my invention, what I claim as new and desire to secure by Letters Patent is:

1. In an electrical system of distribution, in combination, a generator, a battery adapted to be charged thereby, regulating means for said generator including an electroresponsive coil influenced by a function of the generator output, and means automatically operative at intervals independent of the state of battery charge to vary the electrical responsiveness of said coil proportionately to the capacity of said battery to be charged.

2. In a car lighting system, in combination, a generator, a battery adapted to be charged thereby, regulating means for the generator including an electroresponsive coil influenced by a function of the generator output and tending to maintain constancy thereof in spite of generator speed changes, a resistance in series with said coil, and means adapted to vary said resistance but only at intervals when the generator is ineffective to charge the battery.

3. In a car lighting system, in combination, a generator, a battery adapted to be charged thereby, regulating means for said generator including a voltage coil connected across the generator mains and tending to maintain constancy of generator voltage, a variable resistance in series with said coil, and automatic electro-responsive means to establish the setting of said resistance and thereby the responsiveness of said coil in accordance with the voltage of said battery on open circuit and on discharge.

4. In a car lighting system, in combination, a generator, a battery adapted to be charged thereby, regulating means for said generator including a voltage coil connected across the generator mains and tending to maintain constancy of generator voltage, a variable resistance in series with said coil, automatic electro-responsive means to establish the setting of said resistance and thereby the responsiveness of said coil in accordance with the voltage of said battery, and means to prevent variations of said resistance during the connection of said battery with said generator.

5. In a car lighting system in combination, a generator having a shunt field circuit, a battery adapted to be charged by the generator, regulating means for the generator including a voltage responsive coil adapted, under certain conditions, to maintain substantially constant generator voltage in spite of speed changes and in spite of changes in the state of battery charge, a resistance in series with said coil, regulating means for said resistance, and means to render said last mentioned regulating means ineffective to vary said resistance during the interval of regulating effectiveness of said first mentioned regulating means.

6. In a car lighting system, in combination, a variable speed generator, a battery adapted to be charged thereby, regulating means to control said generator as against speed changes, regulating means to govern the action of said first mentioned means, and means to permit the effectiveness of said second regulating means only during the period of ineffectiveness of said first regulating means.

In testimony whereof I affix my signature, in the presence of two witnesses.

BASSETT M. COFFEE.

Witnesses:
F. A. WATSON,
J. THOMSON.